US009031096B2

(12) United States Patent
Wei et al.

(10) Patent No.: US 9,031,096 B2
(45) Date of Patent: May 12, 2015

(54) MULTIMEDIA DATA SYNCHRONIZATION METHOD AND SYSTEM

(75) Inventors: Hsing-Ju Wei, Kee-Lung (TW); Chien-Hua Hsu, Hsinchu (TW); Po-Wen Ku, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 1451 days.

(21) Appl. No.: 11/859,838

(22) Filed: Sep. 24, 2007

(65) Prior Publication Data

US 2009/0080464 A1 Mar. 26, 2009

(51) Int. Cl.
*H04J 3/06* (2006.01)
*H04N 7/56* (2006.01)
*H04N 21/43* (2011.01)
*H04N 21/434* (2011.01)

(52) U.S. Cl.
CPC .............. *H04N 7/56* (2013.01); *H04N 21/4305* (2013.01); *H04N 21/434* (2013.01)

(58) Field of Classification Search
None
See application file for complete search history.

(56) References Cited

U.S. PATENT DOCUMENTS

| | | | |
|---|---|---|---|
| 6,778,609 B2 * | 8/2004 | Nishizawa et al. ...... | 375/240.25 |
| 7,596,639 B2 * | 9/2009 | Ellis et al. ................ | 710/22 |
| 7,653,448 B2 * | 1/2010 | Zoso et al. .................. | 700/94 |
| 2008/0031284 A1 * | 2/2008 | Alderson et al. ........... | 370/503 |

FOREIGN PATENT DOCUMENTS

| | | |
|---|---|---|
| EP | 0 514 041 | 11/1992 |
| EP | 0514041 | 11/1992 |
| EP | 1126722 | 8/2001 |

OTHER PUBLICATIONS

EP Search Report mailed Apr. 29, 2008.
"Nicam Decoder for Digital Multi-Channel TV Sound Broadcast" Shipton G., et al.; IEEE Transactions on Consumer Electronics, IEEE Service Center, New York NY, vol. 37, No. 3, Aug. 1991.
"Television systems; NICAM 728: transmission of two-channel digital sound with terrestrial television systems B, G, H, I, K1 and L" ETSI, EN 300 163 V1.2.1, 1998.

* cited by examiner

*Primary Examiner* — Faruk Hamza
*Assistant Examiner* — Aixa A Guadalupe-Cruz
(74) *Attorney, Agent, or Firm* — McClure, Qualey & Rodack, LLP (57) ABSTRACT

A multimedia data system comprising a synchronization unit. The synchronization unit receives a demodulated bitstream, checks whether a FAW pattern corresponding to a candidate of the bitstream exists, checks whether an additional information corresponding to the candidate of the bitstream is valid when the FAW pattern exists, determines a hit weighting corresponding to the candidate according to the checking result, determines whether the hit weighting meets a criterion and outputs a synchronization signal when the hit weighting meets the criterion.

29 Claims, 8 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 1 | 1 | 1 | 1 | 1 | 1 | 1 | 1 |
| 2 | 1 | 1 | 1 | 1 | 1 | 1 | 1 | 1 | 0 | 0 | 0 | 0 | 0 | 0 | 0 | 0 |
| 3 | 1 | 1 | 0 | 0 | 0 | 0 | 0 | 0 | 0 | 0 | 1 | 1 | 1 | 1 | 1 | 1 |
| 4 | 0 | 0 | 0 | 0 | 1 | 1 | 1 | 1 | 1 | 1 | 1 | 1 | 0 | 0 | 0 | 0 |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 1 | 1 | 1 | 1 | 1 | 1 | 1 | 1 |
| 2 | 1 | 1 | 1 | 1 | 1 | 1 | 1 | 1 | 0 | 0 | 0 | 0 | 0 | 0 | 0 | 0 |
| 3 | 1 | 1 | 0 | 0 | 0 | 0 | 0 | 0 | 0 | 1 | 1 | 1 | 1 | 1 | 1 | 1 |
| 4 | 0 | 0 | 0 | 0 | 1 | 1 | 1 | 1 | 1 | 1 | 1 | 0 | 0 | 0 | 0 | 0 |

MULTIMEDIA DATA SYNCHRONIZATION METHOD AND SYSTEM

BACKGROUND OF THE INVENTION

1. Field of the Invention

The invention relates to data synchronization, and more particularly to multimedia data synchronization method and system utilizing additional information.

2. Description of the Related Art

NICAM (Near Instantaneous Companded Audio Multiplex), an audio multiplex system developed by the BBC, is used in PAL/SECAM TV broadcasting in Europe and Asia. A general NICAM frame starts with an 8-bit "Frame Alignment Word" (FAW), followed by five control bits, eleven bits of unprotected (no parity) additional data, and 704 bits of parity checked data, represented as:

| FAW | Control | Additional Data | Data |
|---|---|---|---|
| (8 bits) | (5 bits) | (11 bits) | (704 bits) |

Five control bits (C0, C1, C2, C3, C4) are provided in each NICAM frame. The first bit C0 is a frame flag used for synchronization of NICAM frames, identifying the odd (C0=1) and even (C0=0) frames. The next three bits C1, C2, and C3 are used to specify the mode of transmission. Table 1 shows the relationship between the mode of operation and the bits C1, C2 and C3. The fifth control bit C4, a reserve sound switching flag, notifies the receiver if NICAM is lost. The receiver can then switch to the frequency modulation (FM) mono sound signal.

TABLE 1

| C1 | C2 | C3 | Mode of operation |
|---|---|---|---|
| 0 | 0 | 0 | One digital stereo channel |
| 0 | 1 | 0 | Two different mono channels (M1 and M2) |
| 1 | 0 | 0 | One 44K data channel and one mono sound channel |
| 1 | 1 | 0 | One 88K data channel (704 Kbit/sec) |

Figure 1:
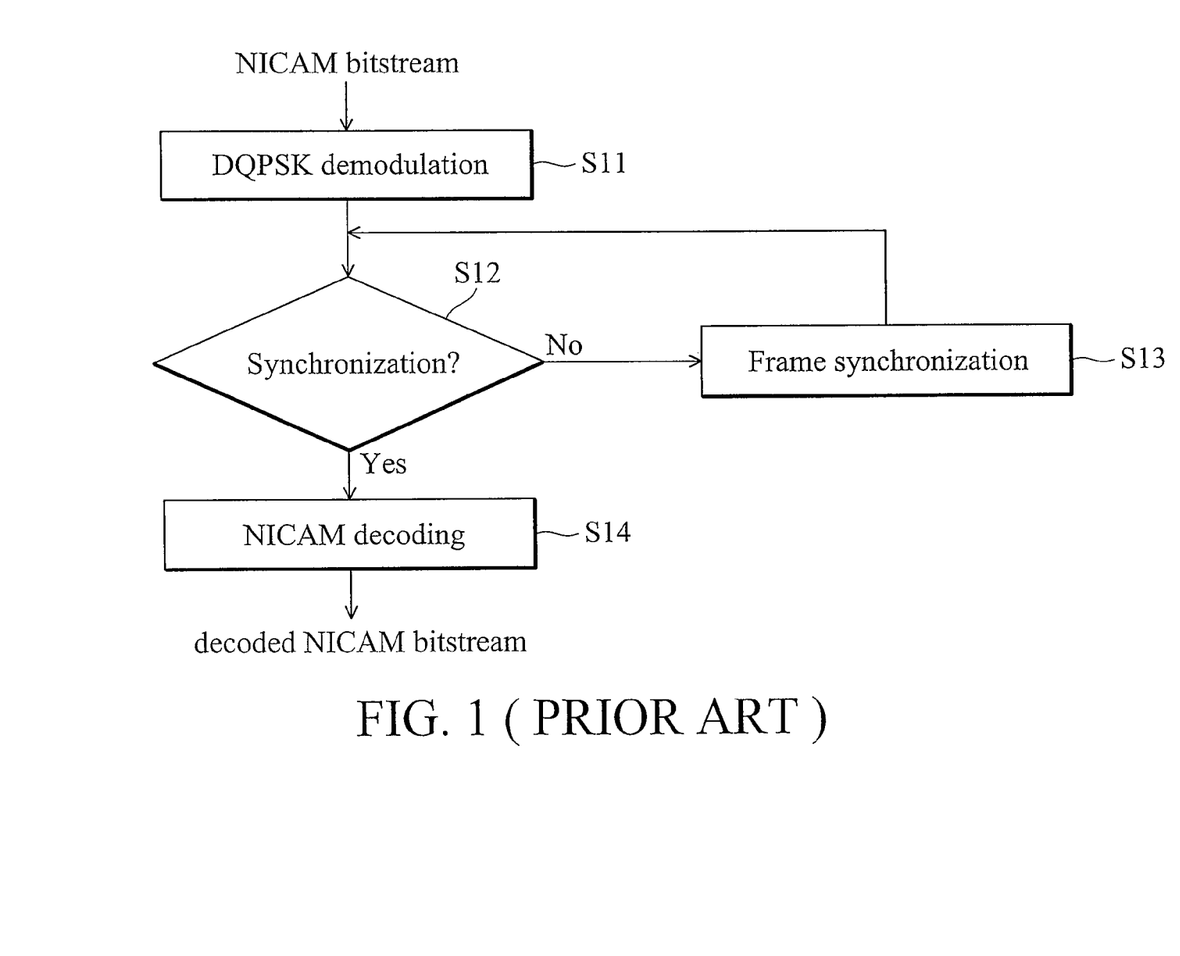
FIG. 1 is a flowchart of an NICAM bitstream processing method.

FIG. 1 is a flowchart of a NICAM bitstream processing method. When a NICAM bitstream is input, differential quaternary phase-shift keying (DQPSK) demodulation is first performed (step S11) to determine whether NICAM frames are synchronized (step S12). If not, the NICAM frames are then synchronized (step S13), and the process proceeds to step S12. If the NICAM frames are synchronized in step S12, the NICAM frames are decoded to output the decoded NICAM bitstream (step S14).

Figure 2:
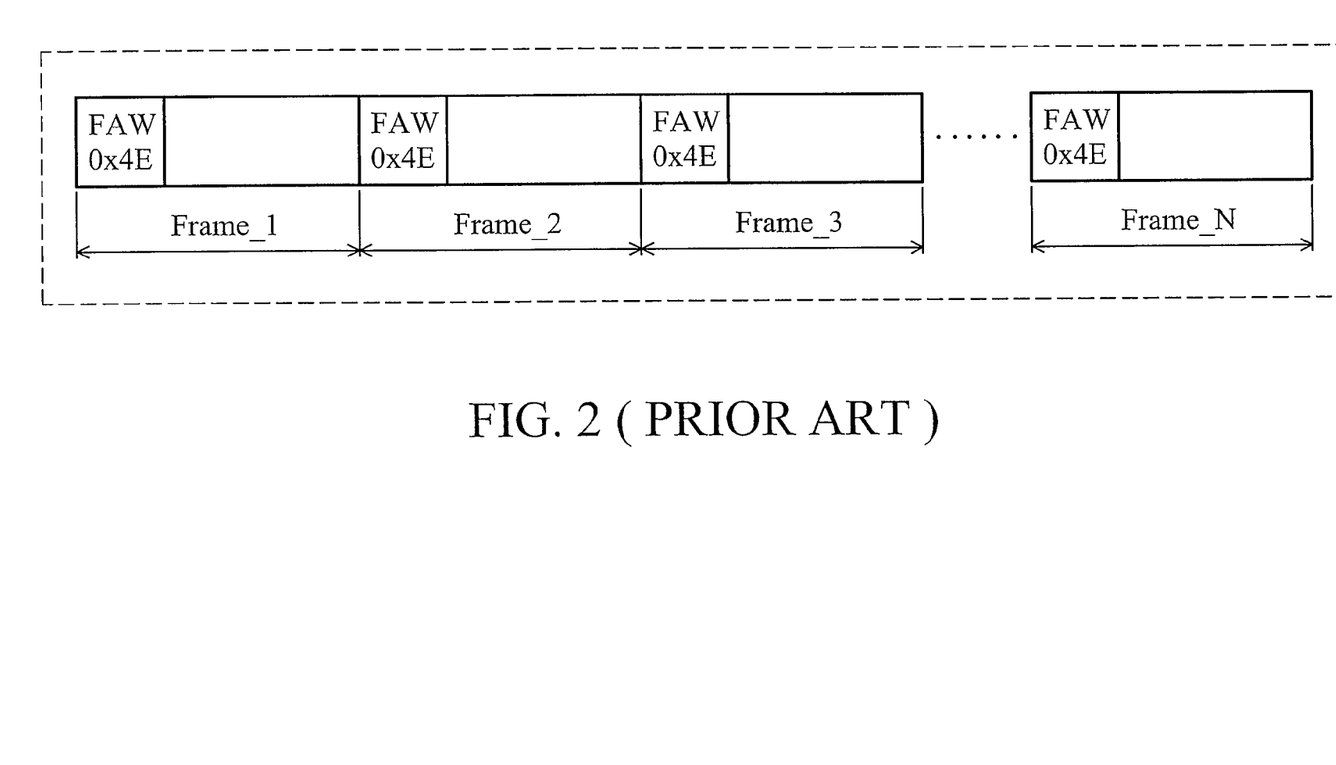
FIG. 2 is schematic view of locating FAWs for decoding an input bitstream.

Referring to FIG. 2, when the NICAM bitstream is received, it is determined whether a FAW with 0x4E is detected. When N FAWs with 0x4E are detected, decoding from the first frame begins. In the described process, however, a bitstream buffer is required to store input data for decoding from the first frame, decoding is not conducted in real time and false alarms may frequently occur. Thus, it is desired to have a method for fast and accurate synchronization.

BRIEF SUMMARY OF THE INVENTION

An embodiment of a synchronization method is provided. The synchronization method comprises receiving a bitstream, checking whether a FAW pattern corresponding to a candidate of the bitstream exists, checking whether an additional information corresponding to the candidate of the bitstream is valid when the FAW pattern exists, determining a hit weighting corresponding to the candidate according to the checking result and determining whether the hit weighting of the candidate meets a criterion.

Another embodiment of a multimedia data system is provided. The multimedia data system comprises a demodulation unit, a synchronization unit and a decoding unit. The demodulation unit demodulates a bitstream to output a demodulated bitstream. The synchronization unit receives the demodulated bitstream, checks whether a FAW pattern corresponding to a candidate of the bitstream exists, checks whether an additional information corresponding to the candidate of the bitstream is valid when the FAW pattern exists, determines a hit weighting corresponding to the candidate when the additional information is valid, checks whether the hit weighting meets a criterion and outputs a synchronization signal when the hit weighting meets the criterion. The decoding unit decodes the synchronization signal to output a decoded bitstream.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 4 through 8, which generally relate to multimedia data synchronization. It is to be understood that the following disclosure provides various different embodiments as examples for implementing different features of the invention. Specific examples of components and arrangements are described in the following to simplify the present disclosure. These are, of course, are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a multimedia data synchronization method, system, and apparatus.

Figure 3:
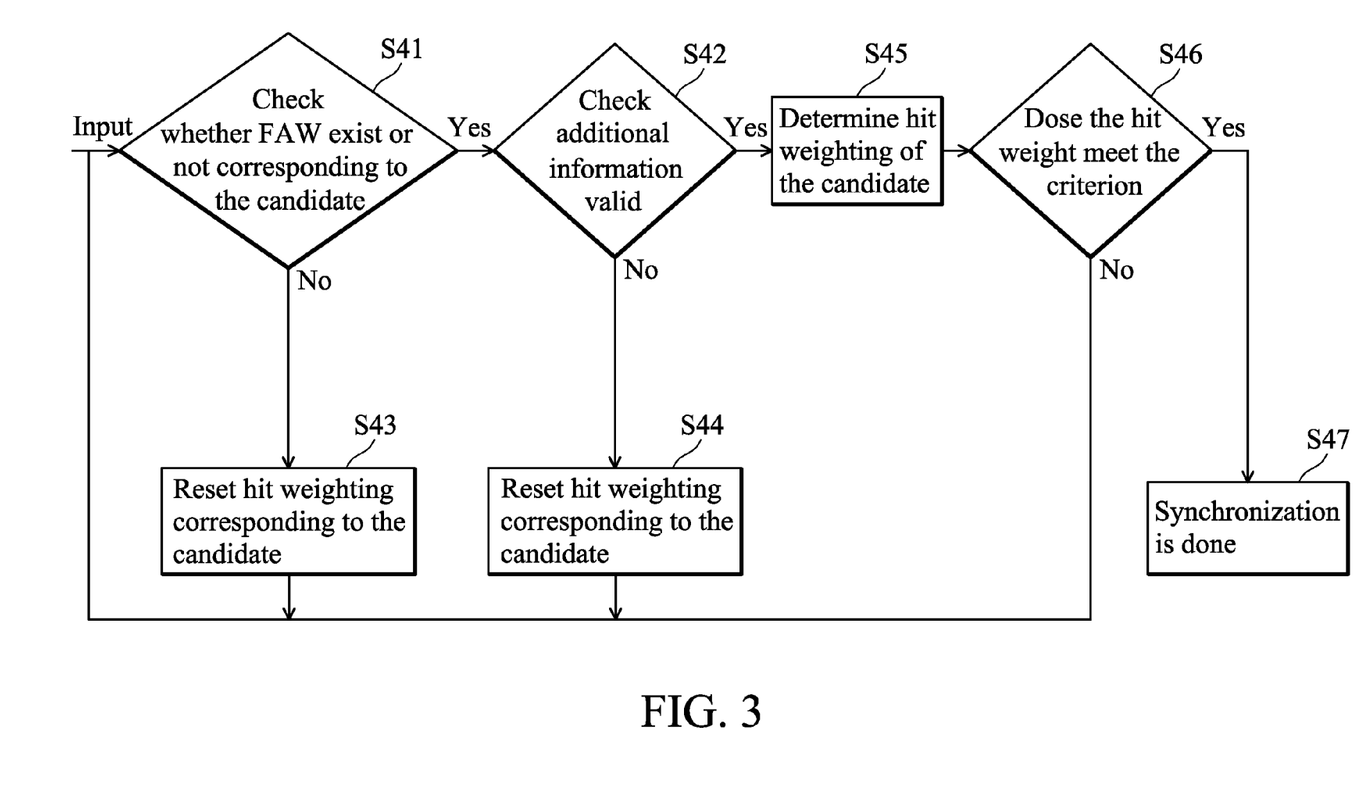
FIG. 3 is a flowchart of a multimedia data synchronization method according to an embodiment of the invention.
Figure 4:
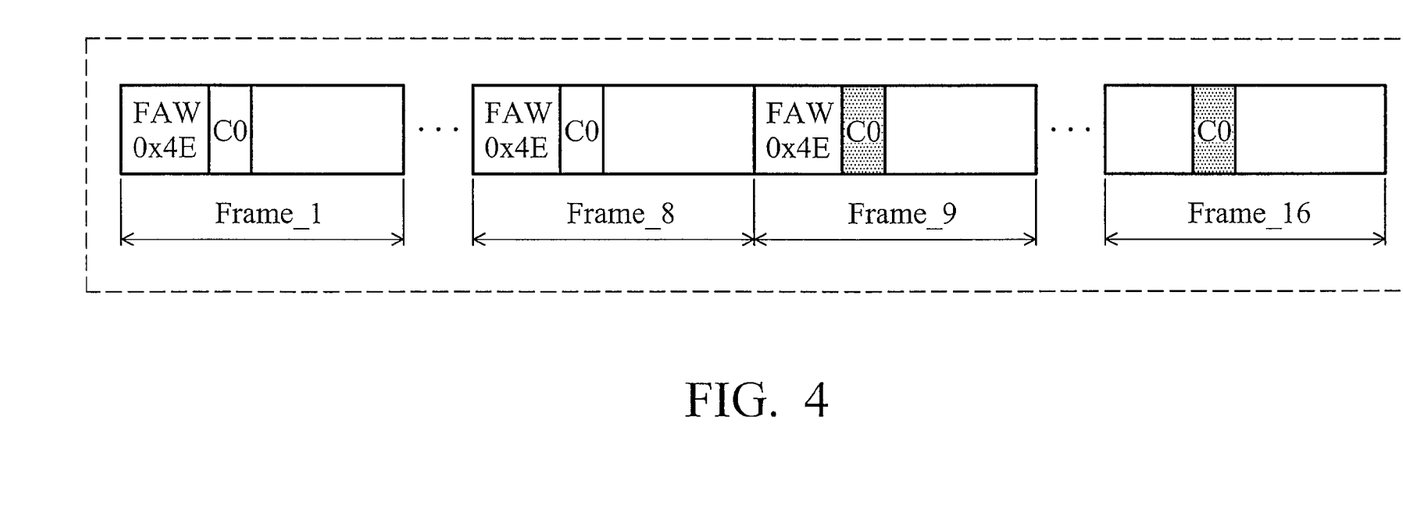
FIG. 4 is schematic view of 16-frame sequence of NICAM bitstream.

FIG. 3 is a flowchart of a multimedia data synchronization method according to an embodiment of the invention. When a bitstream, such as a NICAM bitstream, is input, each bit in a frame of the bitstream is a candidate for a frame start point and a hit weighting for each candidate is calculated for start point determination. A candidate with its subsequent 7 bits are involved to check whether a FAW pattern corresponding to the candidate exists or not (step S41). If the FAW pattern (01001110, 0x4E) corresponding to the candidate does not exist, the hit weighting corresponding to the candidate is reset (step S43) and then a next candidate is checked whether FAW pattern exists or not (step S41). If the FAW pattern (01001110, 0x4E) corresponding to the candidate exists, additional information corresponding to the candidate is checked (step S42). When the additional information corresponding to the candidate is not valid, the hit weighting corresponding to the candidate is reset (step S44) and then the next candidate is checked (going back to step S41). In an embodiment of the invention, the additional information is the first control bit C0 of each frame which is the $9^{th}$ bit counted from the candidate. FIG. 4 shows a 16-frame sequence of NICAM bitstream. As shown, based on the NICAM specification, the control bit, C0, of each NICAM frame are set to 1 for 8 successive frames, and, 0 for the next 8 frames, thus, a 16-frame valid sequence is defined. Other additional information, including frame synchronization word, sampling rate, MPEG layer field, may also be utilized as the additional information for more precise synchronization. If the additional information corresponding to the candidate is valid, the hit weighting corresponding to the candidate is determined or increased (step S45) and then checked whether the hit weighting corresponding to the candidate meets the criterion (step S46). If not, the next candidate is checked (going back to step S41). If the hit weighting corresponding to the candidate meets the criterion, synchronization of the bitstream is completed (step S47). The candidate, which meets the criterion, is found as a frame starting point of the bitstream and decoding of the bitstream is performed accordingly.

Figure 5:
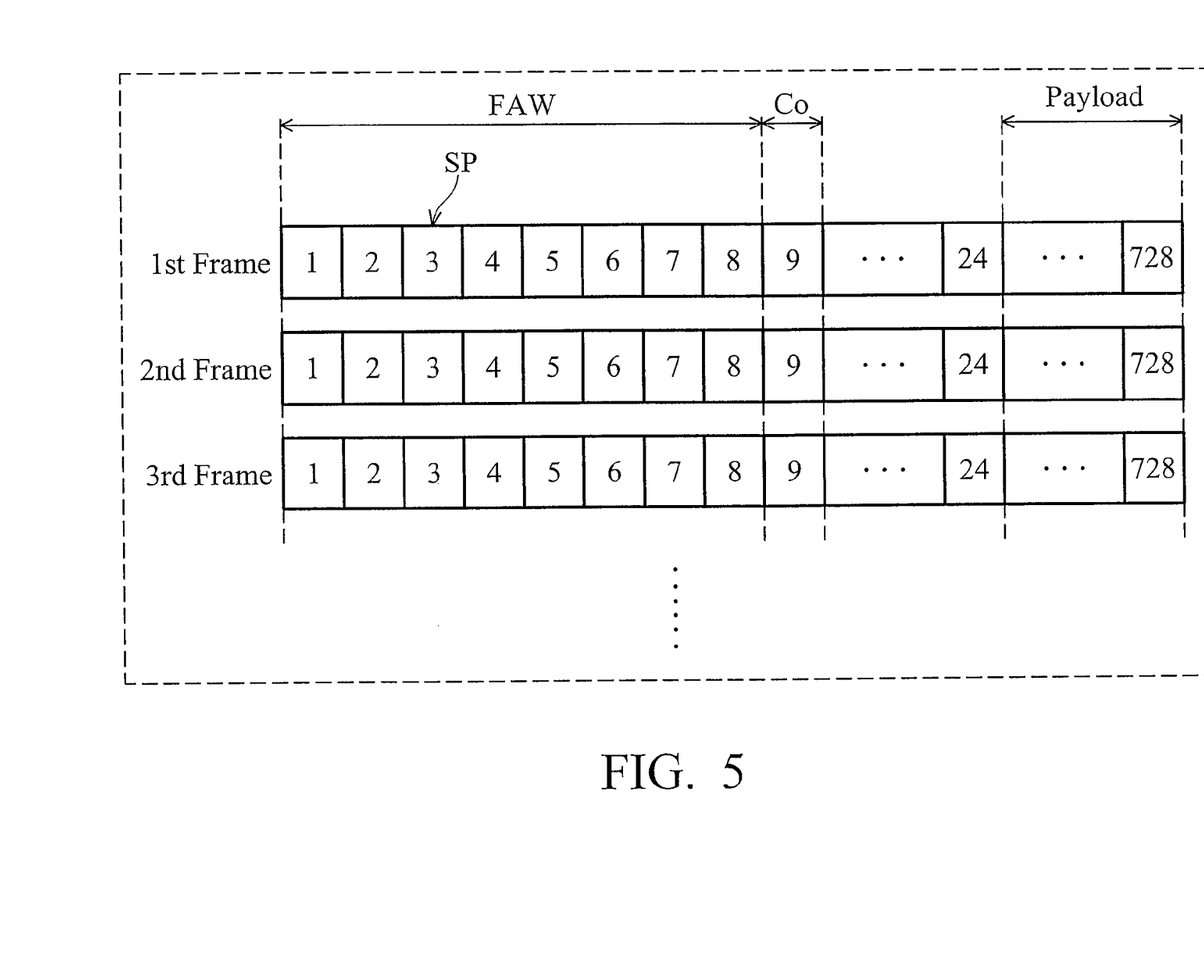
FIG. 5 is a schematic diagram of a bitstream comprising a plurality of NICAM frames according to another embodiment of the invention.

FIG. 5 is a schematic diagram of a bitstream comprising a plurality of NICAM frames according to another embodiment of the invention. The bitstream comprises $1^{st}$ frame, $2^{nd}$ frame, and $3^{rd}$ frame and so on . . . . As described, since each NICAM frame comprises 728 bits, 728 candidates are provided for a frame starting point. The starting point can be anywhere, for example, the first bit of $1^{st}$ frame, the second bit of $1^{st}$ frame or the $728^{th}$ bit of $1^{st}$ frame. Thus, a hit weighting for each corresponding candidate of each frame is calculated for synchronization of the bitstream, wherein the first candidate is the $(728*n+1)_{th}$ sample, the second candidate is the $(728*n+2)_{th}$ sample, . . . , and the $K_{th}$ candidate is $(728*n+k)_{th}$ sample, where n≥0 and is an integer.

For example, if the first received bit SP is the $3^{rd}$ bit of $1^{st}$ frame, the first candidate is $3^{rd}$ bit of $1^{st}$ frame, the second candidate is $4^{th}$ bit of $1^{st}$ frame, the $728^{th}$ candidate is $2^{nd}$ of $2^{nd}$ frame and so forth. When receiving the $3^{rd}$ bit of $1^{st}$ frame, the $3^{rd}$ bit of $1^{st}$ frame together with the subsequent 7 bits, which are $3^{rd}$~$10^{th}$ bits of $1^{st}$ frame, are checked to determine whether the FAW corresponding to the $3^{rd}$ bit of $1^{st}$ frame exists or not (step S41). To more specifically, the $3^{rd}$~$10^{th}$ bits of $1^{st}$ frame are checked whether correspond to "01001110". Additional information corresponding to the candidate, such as the control bit C0 which is the bit followed by the FAW pattern, is then checked to be valid or not (step S42). In other words, the $9^{th}$ bit counted from the $3^{rd}$ bit of $1^{st}$ frame, which is the $11^{th}$ bit of $1^{st}$ frame is checked valid or not. As described, various additional information can be utilized for synchronization, the following will take control bit C0 as an example for further explain the operation of the method of the invention. It is also noted that NICAM bitstream is illustrated as examples but not to be limitative.

Figure 6:
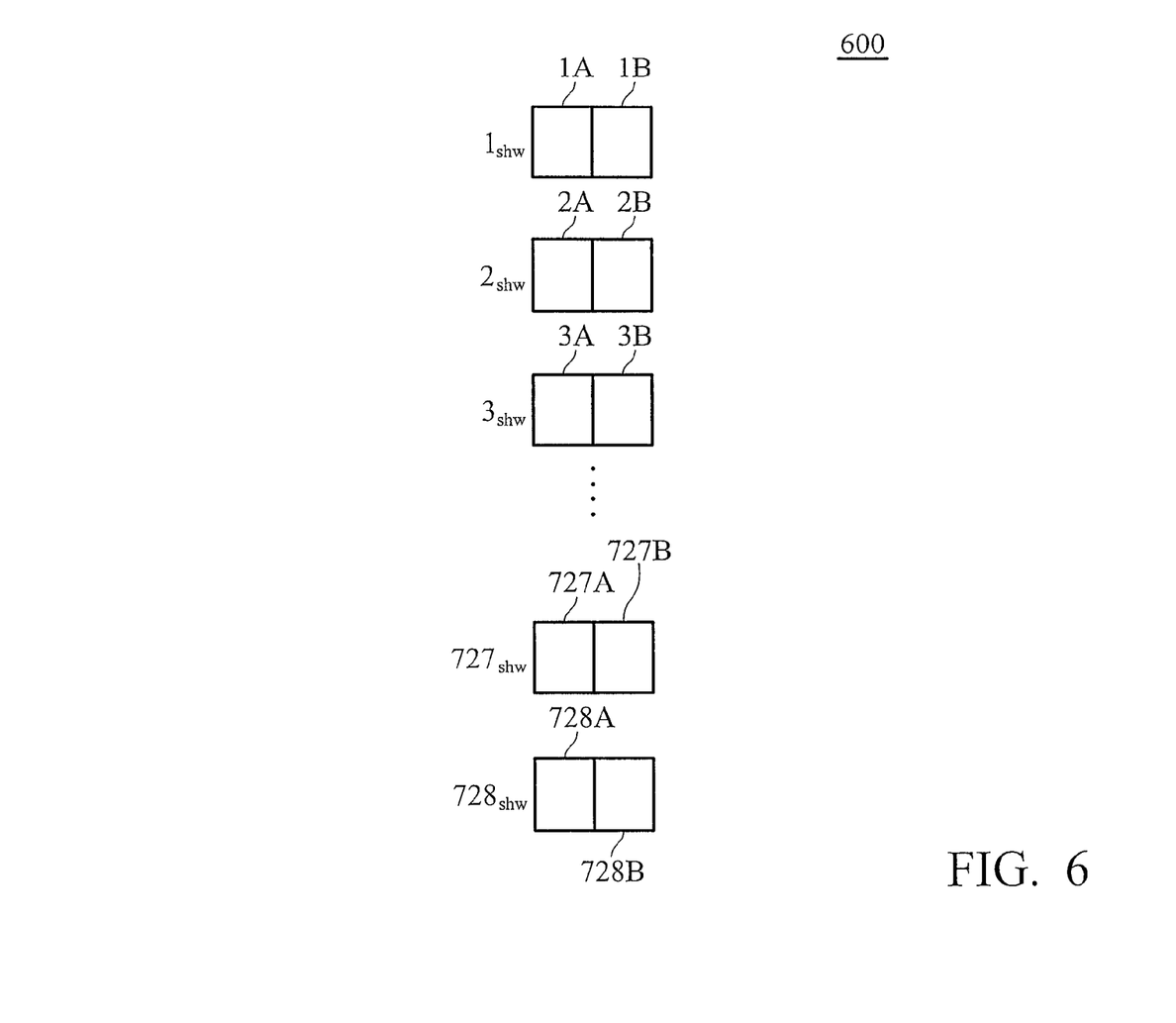
FIG. 6 is a schematic diagram of the hit weighting unit 600 according to another embodiment of the invention.

FIG. 6 is a schematic diagram of the hit weighting unit 600 for calculating hit weightings of candidates according to another embodiment of the invention. The hit weighting unit 600 comprising 728 sub weighting units ($1_{shw}$, $2_{shw}$ . . . $728_{shw}$), wherein each sub weighting unit calculates the hit weighting for a candidate. For example, sub weighting unit $1_{shw}$ calculates the hit weighting for the first candidate, sub weighting unit $2_{shw}$ calculates the hit weighting for the second candidate, and so forth. Each sub weighting unit ($1_{shw}$, $2_{shw}$ . . . $728_{shw}$) comprises two counters 1A~728A and 1B~728B for recording the additional information check result of corresponding candidate. The values of the counters 1A~728A and 1B~728B are determined according to the check result of the additional information of corresponding candidate when the FAW (01001110, 0x4E) pattern corresponding to the candidate exists. Conversely, the counters 1A~728A and 1B~728B are reset when the FAW pattern corresponding to the candidate does not exist. To determine whether the additional information is valid, control bits C0 of 16 frames are involved for checking whether it is a valid control bit sequence. If a 16-frame sequence for the input bitstream provides 8 successive frames with each control bit set to 0 and 8 successive frames with each control bit set to 1, the additional information is valid. Hence, according to an exemplary embodiment, when the additional information is successive 0s, the counter of corresponding candidate (1A, 2A . . . or 728A) is increased. Similarly, when the additional information is successive is, the counter of corresponding candidate (1B, 2B, . . . , or 728B) is increased. When the additional information is not successive 8 0s (without change 0 to 1 one time), the additional information is not valid and the counter (1A, 2A . . . , or 728A) is reset or decreased. When the additional information is not successive 8 1s (without change 1 to 0 one time), the additional information is not valid and the counter (1B, 2B . . . , or 728B) is reset or decreased.

The values of the two counters of each candidate are checked to determine whether a candidate meets the criterion. The synchronization is complete when one of candidates meets the criterion. To summarize above, the criterion is met when the hit weighting calculated by the sub weighting unit of the candidate indicates that 16 FAW patterns corresponding to the candidate are found and the sequence of control bit C0, corresponding to the candidate, is valid where 8 successive C0 bits are equal to 0 and another 8 successive C0 bits are equal to 1. The bitstream is further decoded when synchronization is completed.

According to another embodiment of the invention, the hit weighting corresponding to the candidate is increased when the FAW pattern exists and the additional information is not against a valid sequence. The hit weighting corresponding to the candidate is decreased when the FAW pattern exists and the additional information is not a valid sequence. The hit weight corresponding to the candidate is reset when the FAW pattern corresponding to the candidate does not exist. When the criterion has met a predetermined value for one of the candidates, synchronization is completed and then the bitstream is decoded.

Figure 7:
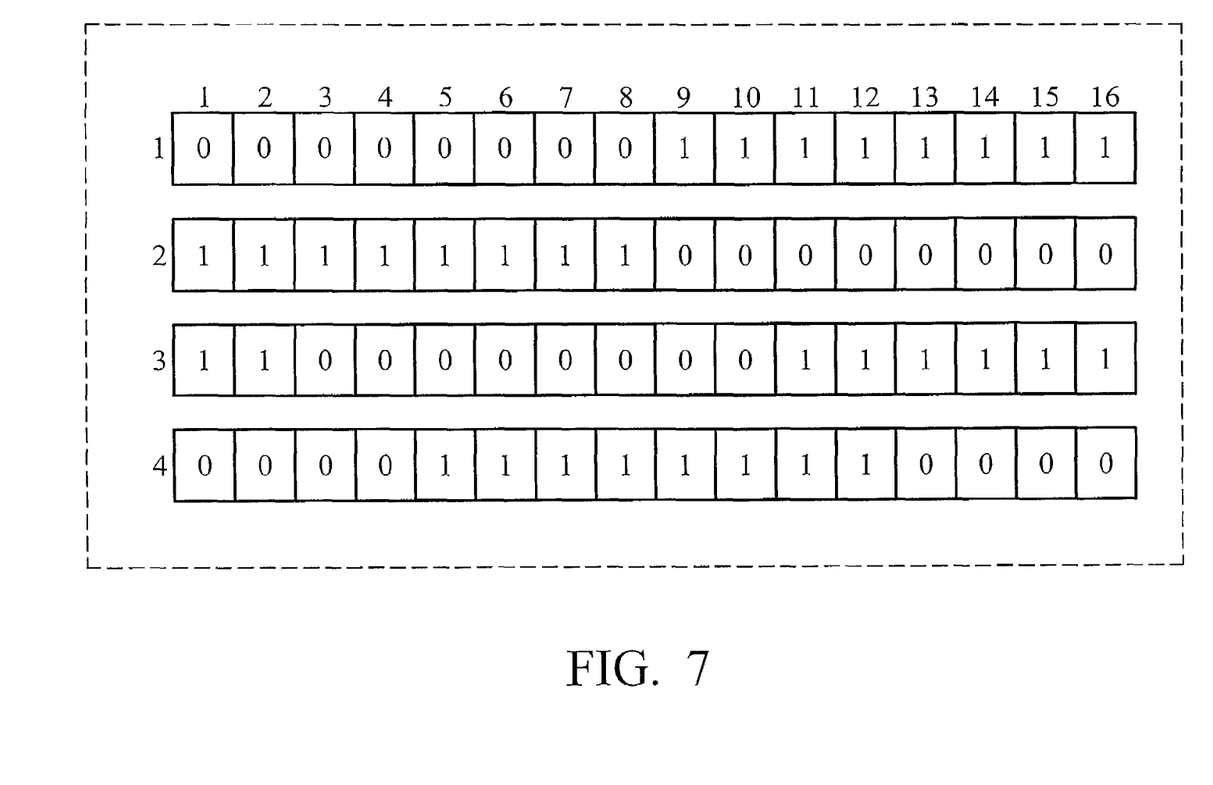
FIG. 7 is a schematic view of combinations of control bit Co according to another embodiment of the invention.

FIG. 7 is a schematic view of valid sequence of control bit values Co according to another embodiment of the invention. According to an embodiment of the invention, checking 11648 (16 frames) successive bits from the starting point SP for synchronization. The valid sequence of control bit values (additional information) C0 bits comprises 0000000011111111, 1111111100000000, 1100000000111111, 0000111111110000, and others. The first and second valid sequences comprise 8 successive Co equal to 0 and another 8 successive Co equal to 1 which corresponds to the criterion. The third valid sequence comprises 8 successive C0 bits equal to 1, counted from the 11-16 C0 bits to the 1-2 C0 bits, and another 8 successive C0 bits equal to 0, which also corresponds to the criterion. The fourth valid sequence comprises 8 successive C0 bits equal to 0, counted from the 13-16 C0 bits to the 1-4 C0 bits, and another 8 successive C0 bits equal to 1, which also corresponds to the criterion. Other combination comprise 8 successive Co equal to 0 and 8 Co equal to 1 or 8 successive Co equal to 1 and 8 Co equal to 0 which also meets the criterion.

Figure 8:
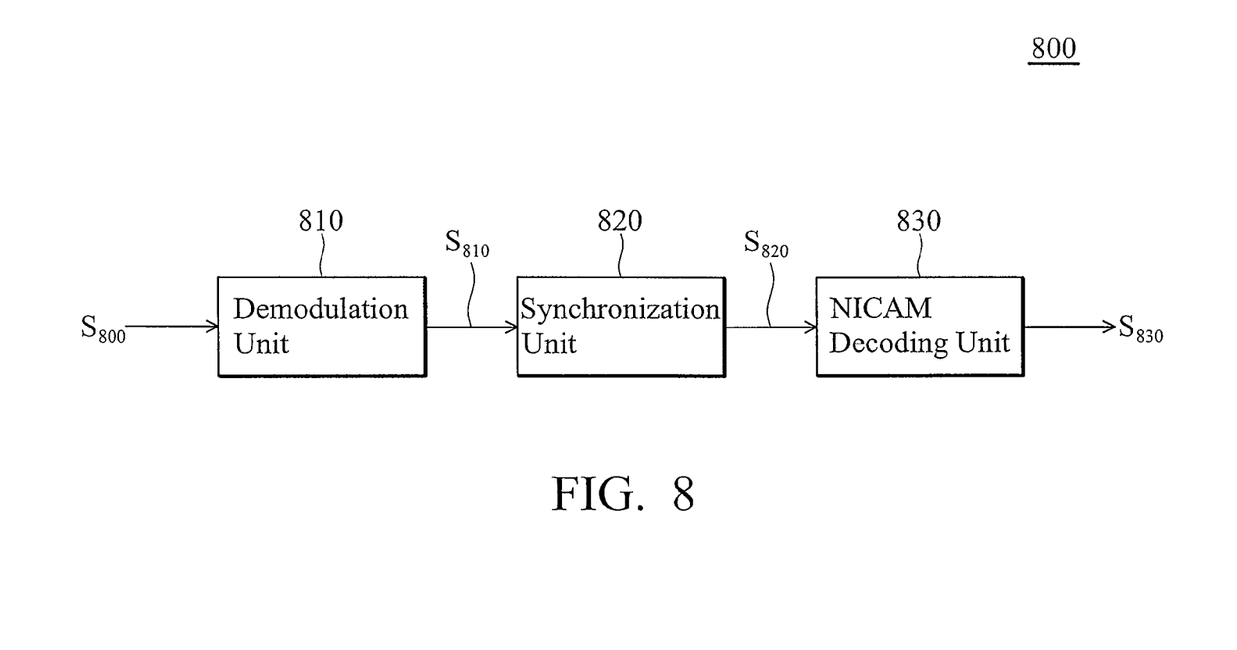
FIG. 8 is a multimedia data system 800 according to another embodiment of the invention.

FIG. 8 is a multimedia data system 800 according to another embodiment of the invention. Multimedia data system 800 comprises demodulation unit 810, synchronization unit 820 and decoding unit 830. Demodulation unit 810 demodulates a bitstream S800 to output demodulated signal S810. Synchronization unit 820 synchronizes demodulated signal S810 to output synchronization signal S820. The decoding unit 830 decodes synchronization signal S820 to outputs decoded bitstream S830. In an embodiment of the invention, the bitstream is a NICAM bitstream.

Further, a television or playback comprises demodulation unit 810 synchronization unit 820 and decoding unit 830 according to another embodiment of the invention.

The invention provides a multimedia data synchronization method and system, which uses less memory and does not require input data to be kept during synchronization. Additionally, when synchronization is completed, the decoding is performed immediately, eliminating processing delay.

The above embodiments of the method and system are also suitable for a constant bit rate bitstream, comprising a DTV transport stream of DTV, MP2, AC3, NICAM, and others.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronization method, comprising:
   receiving a bitstream;
   checking whether an FAW pattern corresponding to a candidate of the bitstream exists;
   checking whether an additional information corresponding to the candidate of the bitstream is valid when the FAW pattern exists, wherein the additional information is a control bit following the FAW pattern of the corresponding candidate;
   determining a valid control bit sequence over a number of 16 frames by counting the successive 0s and the successive 1s from a starting point, wherein a valid control bit sequence comprises a rotation combination of 8 successive 0s and 8 successive 1s over the number of 16 frames and wherein both the 8 successive 0s and the 8 successive 1s are not started from the starting point of the valid control bit sequence; and
   determining a hit weighting corresponding to the candidate according to the checking result, and if the hit weighting corresponding to the candidate meets a criterion, synchronization of the bit stream is completed.

2. The synchronization method as defined in claim 1, wherein when the hit weighting of at least one candidate meets the criterion, decoding the bitstream.

3. The synchronization method as defined in claim 2, wherein the candidate meeting the criterion is a frame start point of the bitstream.

4. The synchronization method as defined in claim 1, wherein the additional information is a bit following the FAW pattern of the corresponding candidate.

5. The synchronization method as defined in claim 1, wherein the hit weighting corresponding to the candidate is increased when the FAW pattern corresponding to the candidate exists and the additional information is not against a valid sequence.

6. The synchronization method as defined in claim 1, wherein the hit weighting corresponding to the candidate is decreased when the FAW pattern corresponding to the candidate exists and the additional information is not a valid sequence.

7. The synchronization method as defined in claim 1, wherein the hit weighting corresponding to the candidate is reset when the FAW pattern corresponding to the candidate does not exist.

8. The synchronization method as defined in claim 1, wherein when the FAW pattern corresponding to the candidate does not exist, a first counter and a second counter of the hit weighting corresponding to the candidate are reset, wherein the first counter and the second counter record the checking result of the additional information for determining the hit weighting corresponding to the candidate.

9. The synchronization method as defined in claim 1, wherein when the additional information corresponding to the candidate is successive 0s, the additional information is valid.

10. The synchronization method as defined in claim 1, wherein when the additional information corresponding to the candidate is successive 1s, the additional information is valid.

11. The synchronization method as defined in claim 1, wherein when the additional information corresponding to the candidate is not successive 0s, the additional information is not valid and the first counter of the hit weighting is reset or decreased.

12. The synchronization method as defined in claim 1, wherein when the additional information corresponding to the candidate is not successive 1s, the additional information is not valid and a second counter of the hit weighting is reset or decreased, wherein the second counter records the checking result of the additional information for determining the hit weighting corresponding to the candidate.

13. The synchronization method as defined in claim 1, wherein the bitstream comprises a plurality of Near-Instantaneously Companded Audio Multiplex (NICAM) frames and each NICAM frames comprises 728 candidates.

14. The synchronization method as defined in claim 1, wherein when the additional information corresponding to the candidate is eight successive 0s and eight 1s or eight successive 1s and eight 0s, the additional information corresponding to the candidate is valid.

15. The synchronization method as defined in claim 1, wherein the criterion is the FAW pattern corresponding to the candidate exists and the additional information corresponding to the candidate is a sequence of 16 bits including 8 successive 0s and 8 1s or 8 successive 1s and 8 0s.

16. The synchronization method as defined in claim 1, wherein the valid control bit sequence comprises 8 successive 0s and 8 successive 1s wherein one change from 0 to 1 and one change from 1 to 0 over the number of 16 frames are allowed.

17. The synchronization method as defined in claim 1, wherein the synchronization of the bit stream is determined without referring to control bit C1, C2, C3 and C4.

18. A multimedia data system, comprising:
a demodulation unit demodulating a bitstream to output a demodulated bitstream;
a synchronization unit receiving the demodulated bitstream, checking whether a FAW pattern corresponding to a candidate of the bitstream exists, checking whether an additional information corresponding to the candidate of the bitstream is valid when the FAW pattern exists, wherein the additional information is a control bit following the FAW pattern of the corresponding candidate, determining a valid control bit sequence over a number of 16 frames by counting the successive 0s and the successive 1s from a starting point, wherein a valid sequence of control bit comprises a rotation combination of 8 successive 0s and 8 successive 1s over the number of 16 frames and wherein both the 8 successive 0s and the 8 successive 1s are not started from the starting point of the valid control bit sequence; determining a hit weighting corresponding to the candidate according to the checking result, determining whether the hit weighting of the candidate meets a criterion, and outputting a synchronization signal when the hit weighting meets the criterion; and
a decoding unit decoding the synchronization signal to output a decoded bitstream.

19. The multimedia data system as defined in claim 18, wherein the hit weighting corresponding to the candidate is increased when the FAW pattern corresponding to the candidate exists and the additional information is not against a valid sequence.

20. The multimedia data system as defined in claim 18, wherein the hit weighting corresponding to the candidate is decreased when the FAW pattern corresponding to the candidate exists and the additional information is not a valid sequence.

21. The multimedia data system as defined in claim 18, wherein the hit weighting corresponding to the candidate is reset when the FAW pattern corresponding to the candidate does not exist.

22. The multimedia data system as defined in claim 18, wherein when the additional information corresponding to the candidate is successive 0s, the additional information is valid.

23. The multimedia data system as defined in claim 18, wherein when the additional information for the candidate is successive 1s, the additional information is valid.

24. The multimedia data system as defined in claim 18, wherein when the additional information corresponding to the candidate is not successive 0s, the additional information is not valid and a first counter of the hit weighting is reset or decreased, wherein the first counter records the checking result of the additional information for determining the hit weighting corresponding to the candidate.

25. The multimedia data system as defined in claim 18, wherein when the additional information corresponding to the candidate is not successive 1s, the additional information is not valid and a second counter of the hit weighting is reset or decreased, wherein the second counter record the checking result of the additional information for determining the hit weighting corresponding to the candidate.

26. The multimedia data system as defined in claim 18, wherein the bitstream comprises a plurality of Near-Instantaneously Companded Audio Multiplex (NICAM) frames and each NICAM frames comprises 728 candidates.

27. The multimedia data system as defined in claim 18, wherein the criterion is the FAW pattern corresponding to the candidate exists and the additional information corresponding to the candidate is a sequence of 16 bits including 8 successive 0s and 8 1s or 8 successive 1s and 8 0s.

28. The multimedia data system as defined in claim 18, wherein the valid control bit sequence comprises 8 successive 0s and 8 successive 1s wherein one change from 0 to 1 and one change from 1 to 0 over the number of 16 frames are allowed.

29. The multimedia data system as defined in claim 18, wherein the synchronization unit determines the synchronization of the bit stream without referring to control bit C1, C2, C3 and C4.

* * * * *